US010804029B2

(12) United States Patent
Hanabusa et al.

(10) Patent No.: US 10,804,029 B2
(45) Date of Patent: Oct. 13, 2020

(54) ROTARY TYPE MAGNETIC COUPLING DEVICE

(71) Applicant: TDK Corporation, Tokyo (JP)

(72) Inventors: Kazuyoshi Hanabusa, Tokyo (JP); Takashi Urano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 256 days.

(21) Appl. No.: 15/729,917

(22) Filed: Oct. 11, 2017

(65) Prior Publication Data

US 2018/0102211 A1 Apr. 12, 2018

(30) Foreign Application Priority Data

Oct. 11, 2016 (JP) ................. 2016-200334

(51) Int. Cl.

| H01F 27/24 | (2006.01) |
|---|---|
| H01F 27/36 | (2006.01) |
| H02J 50/10 | (2016.01) |
| H01F 38/14 | (2006.01) |
| H01F 27/32 | (2006.01) |
| H01F 27/28 | (2006.01) |
| H01F 38/18 | (2006.01) |

(52) U.S. Cl.
CPC ............ *H01F 27/36* (2013.01); *H01F 27/24* (2013.01); *H01F 27/2804* (2013.01); *H01F 27/325* (2013.01); *H01F 38/14* (2013.01); *H01F 38/18* (2013.01); *H02J 50/10* (2016.02)

(58) Field of Classification Search
CPC .......... H01F 27/36; H01F 38/18; H01F 38/14; H01F 27/24; H01F 27/325; H01F 27/2804; H01F 2038/143; H01F 27/365; H01F 27/2823; H02J 50/10; H02J 50/70; H02J 50/005; H02J 50/40
See application file for complete search history.

(56) References Cited

U.S. PATENT DOCUMENTS

| 4,321,572 A | * | 3/1982 | Studer ..................... H01F 38/18 336/120 |
| 5,701,114 A | * | 12/1997 | Chass .................. G01D 5/2291 336/115 |
| 2014/0375262 A1 | | 12/2014 | Yamaguchi et al. |

FOREIGN PATENT DOCUMENTS

| JP | H113828 A | 1/1999 |
| JP | 2007208201 A | 8/2007 |
| JP | 2011003947 A | 1/2011 |
| JP | 2013169122 A | 8/2013 |

* cited by examiner

*Primary Examiner* — Tuyen T Nguyen
(74) *Attorney, Agent, or Firm* — Young Law Firm, P.C.

(57) ABSTRACT

Disclosed herein is a rotary type magnetic coupling device used for a rotator. The rotary type magnetic coupling device includes first and second coils magnetically coupled to each other, and third and fourth coils magnetically coupled to each other. The coil axes of the first and second coils extend in a rotary axis direction of the rotator, and the coil axes of the third and fourth coils radially extend in a radial direction substantially orthogonal to the rotary axis of the rotator.

14 Claims, 14 Drawing Sheets

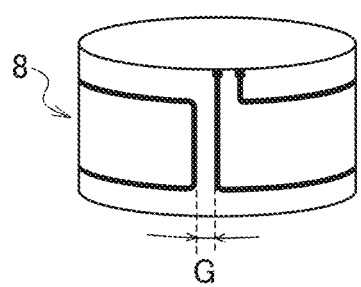 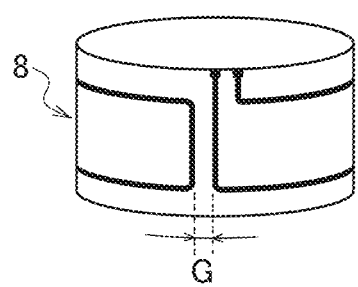 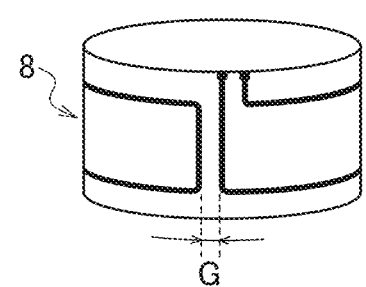
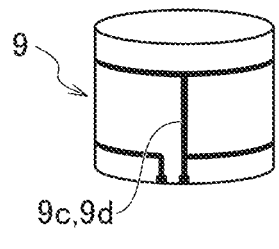 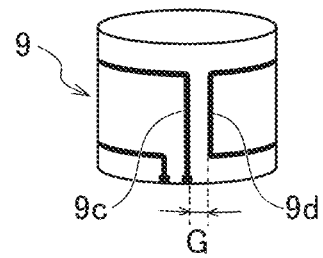 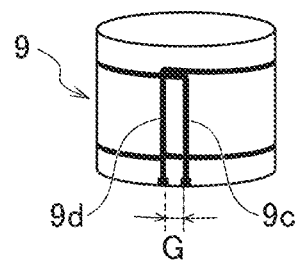
FIG.7A  FIG.7B  FIG.7C

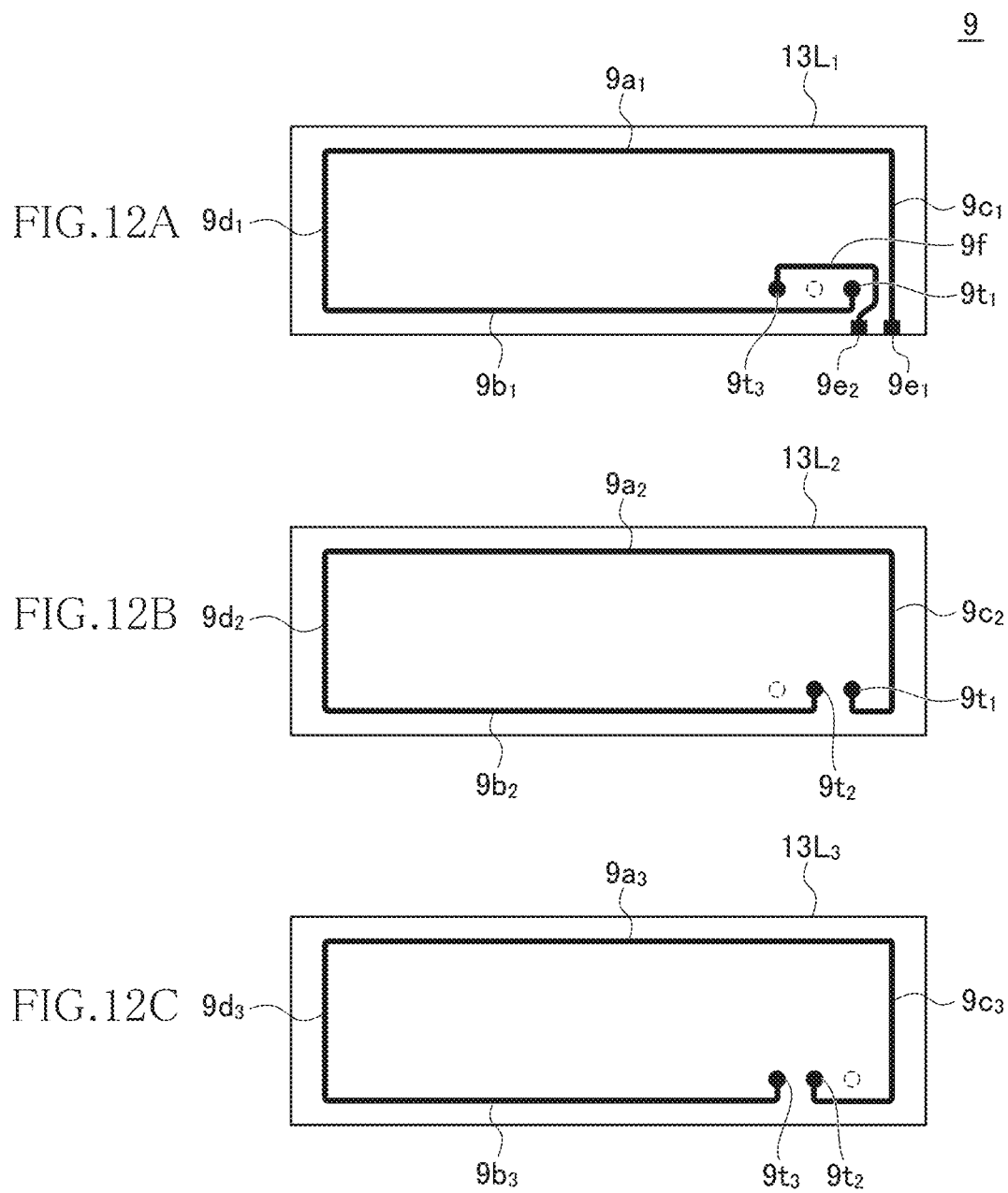

ROTARY TYPE MAGNETIC COUPLING DEVICE

BACKGROUND OF THE INVENTION

Field of the Invention

The present invention relates to a rotary type magnetic coupling device and, more particularly, to a device that transmits electric power or a signal to a rotator by wireless.

Description of Related Art

Rotary type power transmission devices used for electric power transmission to a rotator are suitably used for power supply to, e.g., a multi-axis industrial robot arm, a monitoring camera, a device on a rotary stage, and the like. Conventionally, a contact-type slip ring is used in the rotary type power transmission devices. The slip ring is a mechanism that transmits electric power to a rotary side by bringing a brush provided in a fixed side into contact with a sliding surface of a metal ring installed in the rotary side.

However, energizing is performed by sliding the contact part in the above contact type, so that the contact part is abraded, which may result in failing to perform power transmission. Therefore, a non-contact type wireless power transmission system is now attracting attention.

For example, the wireless power transmission system is achieved as follows. That is, magnetic flux generated by making current flow in a power transmitting coil is allowed to intersect a power receiving coil to thereby generate voltage for power transmission in the power receiving coil. Energy received by the power receiving coil is supplied to a load. In most cases, the load requires stable power, stable voltage, or stable current regardless of the type thereof, and control needs to be performed so as to make any of the power, voltage, and current constant. To realize this control, it is necessary to transmit receiving-side information to the transmitting side in the form of a control signal.

As a transmission method for the control signal, there is known one that uses electromagnetic induction. Further, there are also known a method that uses wireless communication such as Wi-Fi® or Bluetooth® and a method that uses light, such as IR communication that transmits/receives infrared light.

When electromagnetic induction is used, magnetic flux generated in a transmitting coil on the power receiving side is made to intersect a receiving coil on the power transmission side so as to generate voltage for transmission of the control signal. At this time, magnetic flux caused by power transmission may affect the signal transmission.

Under such circumstances, it is demanded that power transmission and signal transmission be simultaneously achieved by the electromagnetic induction.

For example, JP 2011-003947A proposes a signal transmitting/receiving coil of an electromagnetic induction type having a structure hardly affected by magnetic flux caused by power transmission by making a direction Hp of a magnetic field that a power transmitting coil generates orthogonal to a direction Hs of a magnetic field that a signal transmitting coil receives.

JP 2013-169122A proposes an electromagnetic induction type having a structure hardly affected by magnetic flux caused by power transmission by making the axis of a power transmitting coil and the axis of a communicating coil intersect each other.

JP 1999-003828A proposes an electromagnetic induction type having a structure hardly affected by magnetic flux caused by power transmission by arranging a gap between facing surfaces of a power transmitting core and a gap between facing surfaces of a signal transmitting core in parallel planes shifted in the axial direction.

JP 2007-208201A describes a non-contact type power supply device having a power receiving coil provided in a rotator and a power feeding coil provided opposite to the power receiving coil and configured to supply electric power from the power feeding coil to the power receiving coil in a non-contact manner utilizing electromagnetic induction action excited by a change in current flowing in the power feeding coil. In this device, the power feeding coil and power receiving coil each have a long loop shape, and conducting wires running opposite to each other in each of the power feeding and power receiving coils are positioned so as to surround the axis of the rotator at the same side relative thereto.

However, in a case where the technologies disclosed in JP 2011-003947A and JP 2013-169122A are each applied to a rotator, when the power transmitting side or power receiving side is rotated to change the angle between them, the axis of the coil that transmits a signal and the axis of the coil that receives a signal becomes non-parallel, resulting in failing to achieve signal transmission.

In the technology disclosed in JP 1999-003828A, the direction of magnetic flux generated from a power transmitting coil and the direction of magnetic flux generated from a signal transmitting coil are the same, so that magnetic flux caused by power transmission still affects the signal transmission.

In the technology disclosed in JP 2007-208201A, there exists a gap between conducting wires each connecting the upper-side conducting wire and lower-side conducting wire in each of power feeding and power receiving coils, so that the amount of magnetic flux that intersects the power receiving coil is changed with a change in the rotational direction position of the power feeding coil relative to the power receiving coil, resulting in failing to obtain stable output characteristics.

SUMMARY

The present invention has been made in view of the above problems, and an object thereof is to provide a rotary type magnetic coupling device used for a rotator, capable of reducing mutual influence between power transmission and signal transmission.

Another object of the present invention is to provide a rotary type magnetic coupling device used for a rotator, capable of obtaining stable output characteristics even when the positional relationship between coils is changed in accordance with the rotation amount of the rotator.

To solve the above problems, according to the present invention, there is provided a rotary type magnetic coupling device used for a rotator, the magnetic coupling device including a first coil, a second coil disposed so as to be magnetically coupled to the first coil, a third coil, and a fourth coil disposed so as to be magnetically coupled to the third coil. Coil axes of the first and second coils extend in the rotary axis direction of the rotator, and coil axes of the third and fourth coils radially extend in the radial direction orthogonal to the rotary axis of the rotator.

BRIEF DESCRIPTION OF THE DRAWINGS

The above and other objects, features and advantages of this invention will become more apparent by reference to the following detailed description of the invention taken in conjunction with the accompanying drawings, wherein:

FIGS. 7A to 7C are views each illustrating an example of a combination of the signal transmitting coil and the signal receiving coil;

FIG. 10A is a developed plan view, and FIG. 10B is a perspective view;

FIG. 11A is a developed plan view, FIG. 11B is a perspective view, and FIG. 11C is a perspective view illustrating a comparison example;

FIGS. 12A to 12C are plan views of a third modification of the signal receiving coil, which illustrate pattern layouts of respective layer constituting a multilayer coil.

DETAILED DESCRIPTION OF THE EMBODIMENTS

Preferred embodiments of the present invention will now be explained in detail with reference to the drawings.

Figure 1:
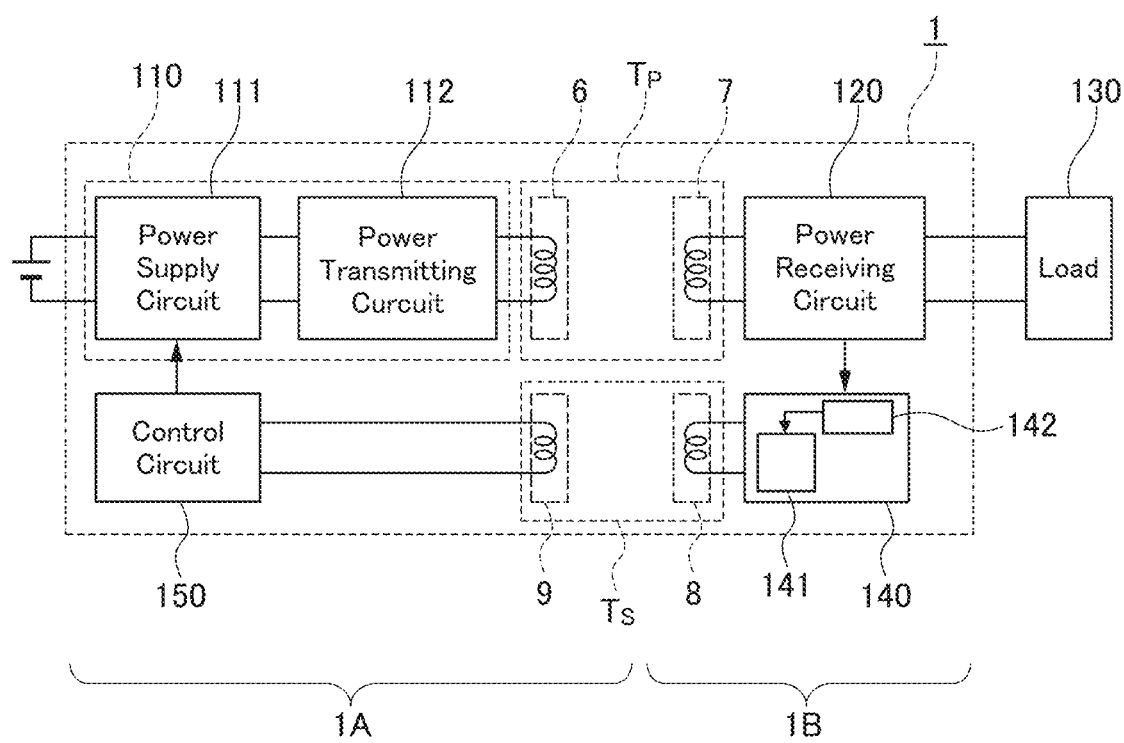
FIG. 1 is a block diagram schematically illustrating the entire configuration of a rotary type magnetic coupling device according to an embodiment of the present invention.

FIG. 1 is a block diagram schematically illustrating the entire configuration of a rotary type magnetic coupling device according to an embodiment of the present invention.

As illustrated in FIG. 1, a rotary type magnetic coupling device 1 is constituted of a combination of a power transmitting unit 1A and a power receiving unit 1B. The rotary type magnetic coupling device 1 is configured to transmit electric power from the power transmitting unit 1A to the power receiving unit 1B by wireless.

The power transmitting unit 1A includes a power transmitting circuit 110, a power transmitting coil 6, a signal receiving coil 9, and a control circuit 150. The power transmitting circuit 110 converts an input DC voltage into an AC voltage of, e.g., 100 kHz and outputs it. The power transmitting coil 6 generates an AC magnetic flux using the AC voltage. The signal receiving coil 9 receives an AC signal transmitted from the power receiving unit 1B. The control circuit 150 controls the AC voltage output from the power transmitting circuit 110 based on the AC signal received by the signal receiving coil 9.

The power receiving unit 1B includes a power receiving coil 7, a power receiving circuit 120, a signal generating circuit 140, and a signal transmitting coil 8. The power receiving coil 7 receives at least a part of the AC magnetic flux generated by the power transmitting coil 6 to generate an AC voltage. The power receiving circuit 120 converts the AC voltage generated in the power receiving coil 7 into a DC voltage of, e.g., 24 V. The signal generating circuit 140 generates an AC signal representing the magnitude of an output voltage or an output current of the power receiving circuit 120. The signal transmitting coil 8 transmits the AC signal to the signal receiving coil 9. The output voltage of the power receiving circuit 120 is supplied to, e.g., a load 130.

The power transmitting circuit 110 includes a power supply circuit 111 and a voltage converting circuit 112. The power supply circuit 111 converts an input DC voltage into a predetermined DC voltage. The voltage converting circuit 112 converts the predetermined DC voltage output from the power supply circuit 111 into an AC voltage of, e.g., 100 kHz. The control circuit 150 controls the magnitude of the predetermined DC voltage to be output from the power supply circuit 111 based on the AC signal received by the signal receiving coil 9 to thereby control the AC voltage output from the power transmitting circuit 110.

The signal generating circuit 140 includes an oscillating circuit 141 and a power supply voltage generating circuit 142. The oscillating circuit 141 outputs an AC signal of, e.g., 10 MHz. The power supply voltage generating circuit 142 generates a power supply voltage for the oscillating circuit 141 in accordance with the magnitude of the output voltage or output current of the power receiving circuit 120. The power supply voltage generating circuit 142 controls the power supply voltage for the oscillating circuit 141 based on a difference between the output voltage or output current of the power receiving circuit 120 and a target value.

As described above, an output from the power receiving unit 1B is fed back to the power transmitting unit 1A through the signal transmitting coil 8 and the signal receiving coil 9, whereby the output power from the power receiving unit 1B can be controlled to be constant.

In the present embodiment, the frequency of the AC voltage for power transmission is 100 kHz, while the frequency of the AC signal for signal transmission is 10 MHz which is 100 times the frequency of the AC voltage for power transmission. The frequency of the AC signal for signal transmission is preferably equal to or more than 10 times the frequency of the AC voltage for power transmission. When the frequency of the AC signal for signal transmission is equal to or more than 10 times the frequency of the AC voltage for power transmission, it is possible to prevent a harmonic of the AC voltage for power transmission from distorting an output signal waveform as noise for the AC signal, thereby avoiding interference between the power transmission side and the signal transmission side, which can ensure transmission quality of the AC signal.

In the present embodiment, a combination of the power transmitting coil 6 and the power receiving coil 7 constitutes a rotary transformer $T_P$ of a power system incorporated in a rotator, and a combination of the signal transmitting coil and the signal receiving coil 9 constitutes a rotary transformer $T_S$ of a signal system incorporated in the same rotator as that incorporates the power system rotary transformer $T_P$.

Figure 2:
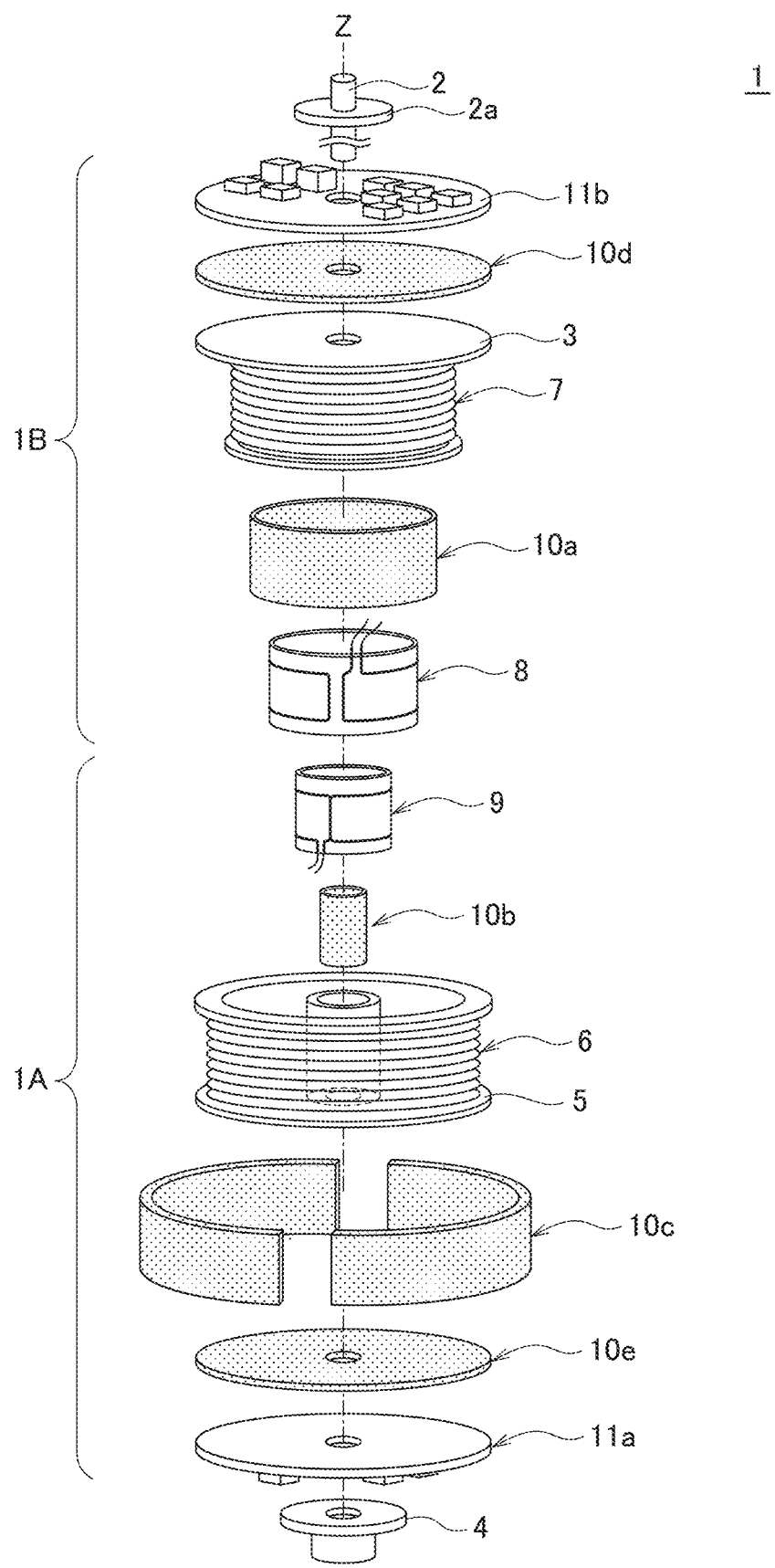
FIG. 2 is an exploded perspective view illustrating the structure of the rotary type magnetic coupling device shown in FIG. 1.
Figure 3:
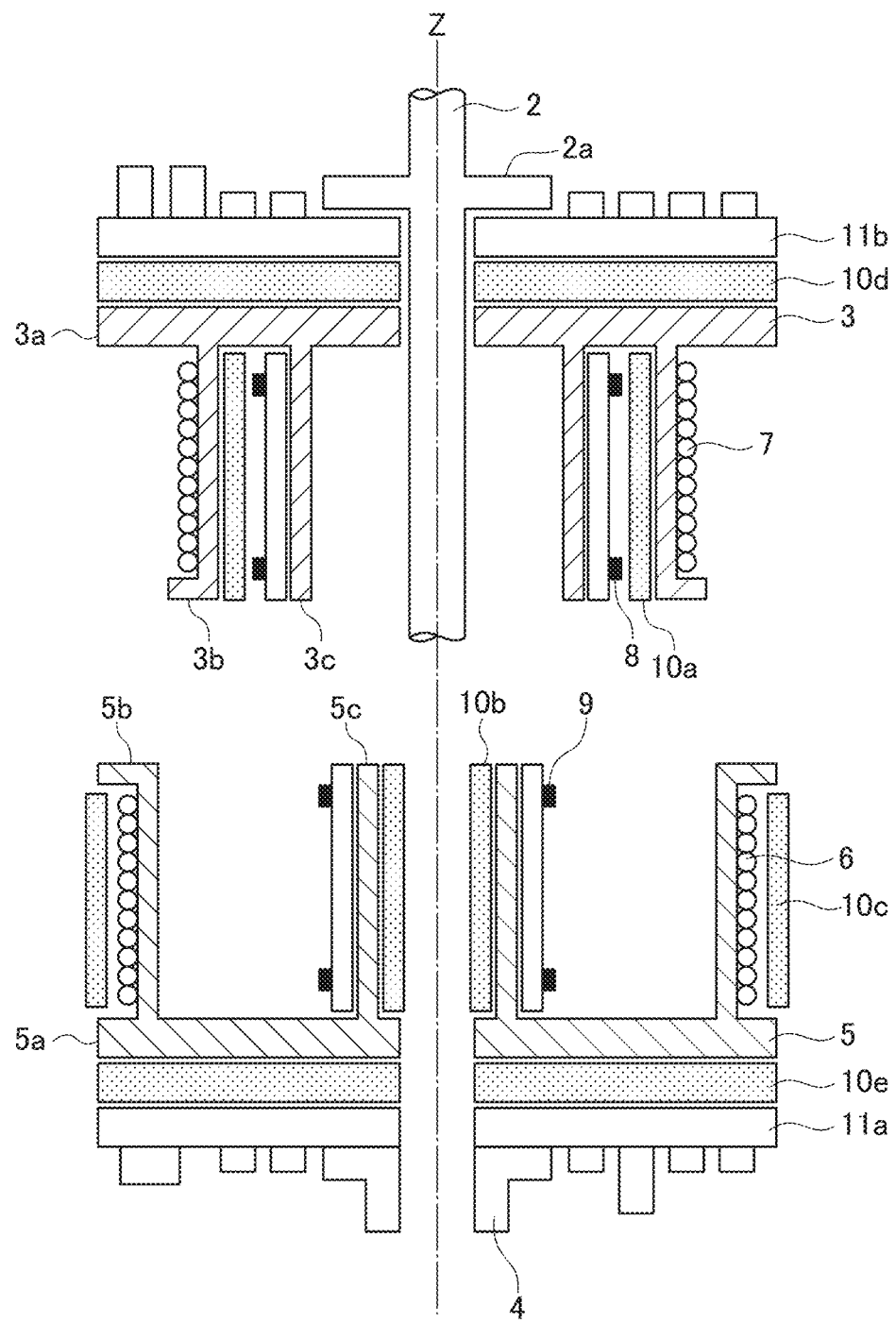
FIG. 3 is an exploded cross-sectional view illustrating a state where the rotary type magnetic coupling device shown in FIG. 2 is divided into the power transmitting unit and the power receiving unit.
Figure 4:
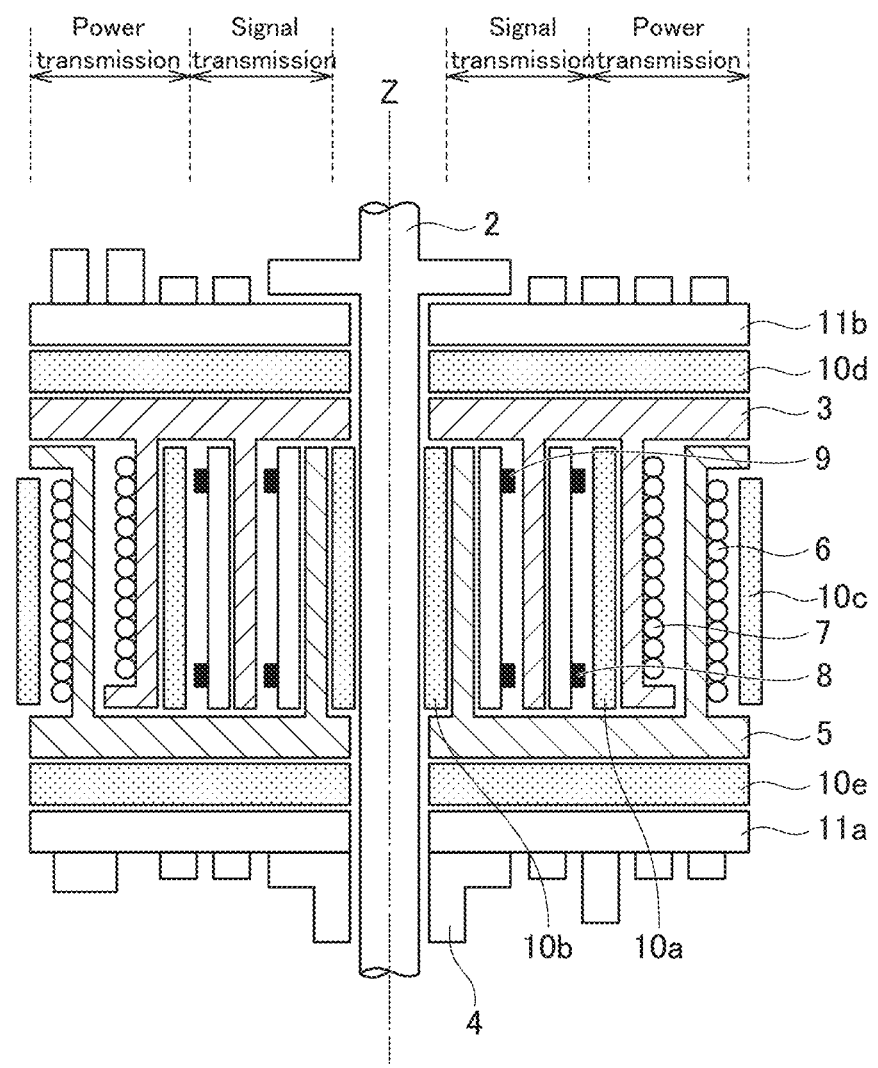
FIG. 4 is a cross-sectional view illustrating a state where the power transmitting unit and power receiving unit of the rotary type magnetic coupling device shown in FIG. 3 are assembled to each other.

FIG. 2 is an exploded perspective view illustrating the structure of the rotary type magnetic coupling device 1 according to the present embodiment. FIG. 3 is an exploded cross-sectional view illustrating a state where the rotary type magnetic coupling device 1 shown in FIG. 2 is divided into the power transmitting unit 1A and the power receiving unit 1B. FIG. 4 is a cross-sectional view illustrating a state where the power transmitting unit 1A and power receiving unit 1B of the rotary type magnetic coupling device 1 shown in FIG. 3 are assembled to each other.

As illustrated in FIGS. 2 to 4, the rotary type magnetic coupling device 1 includes a rotary bobbin 3 mounted to a flange part 2a of a rotary shaft 2 as a rotator and configured to be rotated together with the rotary shaft 2, a fixed bobbin 5 mounted to a support member 4 as a non-rotary body and configured not to be rotated together with the rotary shaft 2, the power transmitting coil 6 and the signal receiving coil 9 which are provided in the fixed bobbin 5, the power receiving coil 7 and the signal transmitting coil 8 which are provided in the rotary bobbin 3, a power transmitting circuit board 11a connected to the power transmitting coil 6 and the signal receiving coil 9, and a power receiving circuit board 11b connected to the power receiving coil 7 and the signal transmitting coil 8. In the present embodiment, the rotary shaft 2 is made of metal and penetrates the center portions of the respective rotary bobbin 3 and fixed bobbin 5.

The rotary bobbin 3 and the fixed bobbin 5 are made of resin and have cup shapes that can be fitted to each other. Specifically, the rotary bobbin 3 has a cup shape having an opening facing downward, and the fixed bobbin 5 has a cup shape having an opening facing upward. The rotary bobbin 3 is freely rotatably fitted to the fixed bobbin 5 and integrated with the fixed bobbin 5 in appearance. The fixed bobbin 5 is fixed to the support member 4 and is thus not rotated together with the rotary shaft 2. The positional relationship between the fixed bobbin 5 and the rotary bobbin 3 in the vertical direction is set conveniently in this example and may be reversed.

The rotary bobbin 3 and the fixed bobbin 5 each have a double cylindrical side-wall structure. Specifically, the rotary bobbin 3 has a circular upper surface part 3a (main surface part), a cylindrical outer side-surface part 3b provided inside the outermost periphery of the upper surface part 3a in the radial direction, and an inner side-surface part 3c provided inside the outer side-surface part 3b in the radial direction. The fixed bobbin 5 has a circular bottom surface part 5a (main surface part), an outer side-surface part 5b provided slightly inside the outermost periphery of the bottom surface part 5a in the radial direction, and an inner side-surface part 5c provided inside the outer side-surface part 5b in the radial direction. As illustrated in FIG. 4, in a state where the rotary bobbin 3 is fitted to the fixed bobbin 5, the outer side-surface part 3b and the inner side-surface part 3c of the rotary bobbin 3 are disposed in a space between the outer side-surface part 5b and the inner side-surface part 5c of the fixed bobbin 5.

The power transmitting coil 6 is composed of a conducting wire wound in multiple around the outer peripheral surface of the outer side-surface part 5b of the fixed bobbin 5, and the power receiving coil 7 is composed of a conducting wire wound in multiple around the outer side-surface part 3b of the rotary bobbin 3. Using a conductive wire having a certain degree of thickness for the power transmitting coil 6 and power receiving coil 7 enables wireless transmission of a large amount of power.

The power transmitting coil 6 and the power receiving coil 7 are disposed coaxially with the rotary shaft 2 so as to surround the rotary shaft 2. In the present embodiment, the power receiving coil 7 is concentrically disposed inside the power transmitting coil 6 in the radial direction; however, the power receiving coil 7 may be concentrically disposed outside the power transmitting coil 6 in the radial direction. The opening of the power transmitting coil 6 faces the extending direction (rotary axis Z-direction) of the rotary shaft 2, and the opening of the power receiving coil 7 also faces the extending direction (rotary axis direction) of the rotary shaft 2, so that the direction of a coil axis of the power receiving coil 7 and the direction of a coil axis of the power transmitting coil 6 coincide with each other. Thus, the opening of the power receiving coil 7 overlaps the opening of the power transmitting coil 6, whereby strong magnetic coupling is generated between the power receiving coil 7 and the power transmitting coil 6.

The signal transmitting coil 8 is provided on the outer peripheral surface of the inner side-surface part 3c of the rotary bobbin 3. The signal receiving coil 9 is provided on the outer peripheral surface of the inner side-surface part 5c of the fixed bobbin 5. The signal transmitting coil 8 and the signal receiving coil 9 are disposed coaxially with the rotary shaft 2 such that the openings thereof surround the rotary shaft 2. In the present embodiment, the signal receiving coil 9 is concentrically disposed inside the signal transmitting coil 8 in the radial direction; however, the signal receiving coil 9 may be concentrically disposed outside the signal transmitting coil 8 in the radial direction. With the above configuration, the coil axes of the respective signal transmitting coil 8 and signal receiving coil 9 radially extend in the radial direction of the rotator, and the opening of the signal receiving coil 9 overlaps the opening of the signal transmitting coil 8 in the radial direction.

Magnetic members (ferrite cores) are provided inside and outside the rotary bobbin 3 and fixed bobbin 5. Specifically, the magnetic members include an intermediate magnetic member 10a provided so as to overlap the signal transmitting coil 8 on the inner side-surface part 3c of the rotary bobbin 3, an inner magnetic member 10b provided at a position inside (inside the inner side-surface part 5c of the fixed bobbin 5) the signal transmitting coil 8 and signal receiving coil 9 in the radial direction and between the signal transmitting and signal receiving coils 8 and 9 and the rotary shaft 2, an outer magnetic member 10c provided so as to overlap the power transmitting coil 6 on the outer side-surface part 5b of the fixed bobbin 5, an upper surface magnetic member 10d covering the upper surface part 3a of the rotary bobbin 3, and a bottom surface magnetic member 10e covering the bottom surface part 5a of the fixed bobbin 5.

The intermediate magnetic member 10a (first magnetic member) is disposed between the power system rotary transformer $T_P$ constituted of a combination of the power transmitting coil 6 and the power receiving coil 7 and signal system rotary transformer $T_S$ constituted of a combination of the signal transmitting coil 8 and the signal receiving coil and configured to magnetically isolate the rotary transformers $T_P$ and $T_S$. With this configuration, the power transmitting coil 6 and the power receiving coil 7 as well as the signal transmitting coil 8 and the signal receiving coil 9 are magnetically shielded from each other, whereby mutual influence between power transmission and signal transmission can be reduced further.

The inner magnetic member 10b (second magnetic member) is disposed inside the signal receiving coil 9 disposed at the innermost periphery in the radial direction. Particularly, the inner magnetic member 10b is disposed between the rotary shaft 2 and the signal receiving coil 9 so as to surround the rotary shaft 2. With this configuration, even when the metal rotary shaft 2 is disposed near the signal system rotary transformer $T_S$ constituted of a combination of the signal transmitting coil 8 and the signal receiving coil 9, it is possible to reduce an eddy current loss caused due to intersection of magnetic flux generated by the signal transmitting coil 8 and the signal receiving coil 9 with the rotary shaft 2.

The outer magnetic member 10c (third magnetic member) is disposed outside the power transmitting coil 6 disposed at the outermost periphery in the radial direction. With this configuration, even when a metal member is disposed near the power system rotary transformer $T_P$ constituted of a combination of the power transmitting coil 6 and the power receiving coil 7, it is possible to reduce an eddy current loss caused due to intersection of magnetic flux generated by the power transmitting coil 6 and the power receiving coil 7 with the metal member.

The upper surface magnetic member 10d and the bottom surface magnetic member 10e (which are fourth magnetic members) constitute a magnetic cover that covers the entire cylindrical case constituted of the rotary bobbin 3 and fixed bobbin 5 together with the outer magnetic member 10c. With this configuration, a magnetic path can be formed at both sides of the four coils in the rotary axis direction, thereby forming both a closed magnetic path of magnetic flux generated by the power transmitting coil 6 and power receiving coil 7 and a closed magnetic path of magnetic flux generated by the signal transmitting coil 8 and signal receiving coil 9. Therefore, it is possible to further reduce an electric power loss and a signal loss.

The power receiving circuit board 11b is mounted to the upper surface part 3a of the rotary bobbin 3 with an intervention of the upper surface magnetic member 10d. One and the other ends of the power receiving coil 7 are connected to the power receiving circuit board 11b. In order to realize such connections, a wiring slit or a through hole is preferably formed in the upper surface part 3a of the rotary bobbin 3 and/or the upper surface magnetic member 10d.

The power transmitting circuit board 11a is mounted to the bottom surface part 5a of the fixed bobbin 5 with an intervention of the bottom surface magnetic member 10e. One and the other ends of the power transmitting coil 6 are connected to the power transmitting circuit board 11a. In order to realize such connections, a wiring slit or a through hole is preferably formed in the bottom surface part 5a of the fixed bobbin 5 and/or the bottom surface magnetic member 10e.

As illustrated in FIG. 4, the power transmitting coil 6 and power receiving coil 7 constituting the power system rotary transformer $T_P$ are concentrically disposed outside the signal transmitting coil 8 and the signal receiving coil 9 constituting the signal system rotary transformer $T_S$ in the radial direction. With this configuration, as compared to a case where the signal transmitting coil 8 and the signal receiving coil 9 are disposed outside the power transmitting coil 6 and the power receiving coil 7 in the radial direction, the opening sizes (loop sizes) of the respective power transmitting coil 6 and the power receiving coil 7 can be made larger, thus making it possible to obtain stronger magnetic coupling. Further, with this configuration, the inductances of the signal transmitting coil 8 and the signal receiving coil 9 can be increased. Thus, it is possible to achieve non-contact transmission of a larger amount of power while reducing the size of the entire rotary transformer.

Figure 5A:
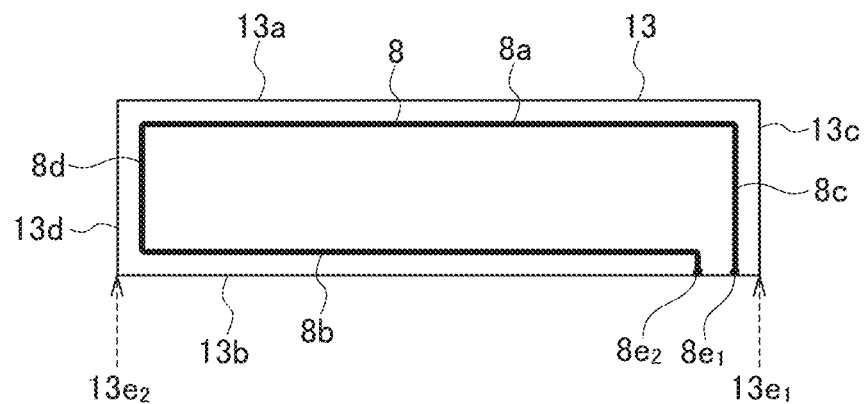
FIGS. 5A and 5B are views each illustrating the configuration of the signal transmitting coil.
Figure 5B:
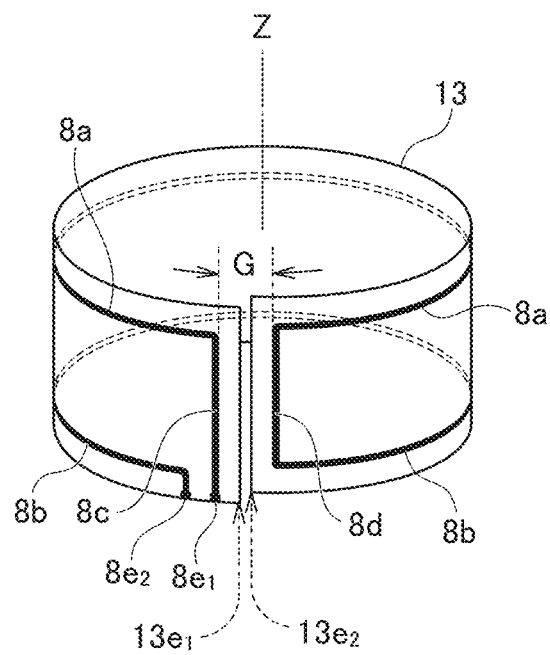

FIGS. 5A and 5B are views each illustrating the configuration of the signal transmitting coil 8. FIG. 5A is a developed plan view, and FIG. 5B is a perspective view.

As illustrated in FIG. 5A, the signal transmitting coil 8 is obtained by printing a conductor pattern on the surface layer or inner layer of an elongated, flexible substrate 13 (insulating film) having a substantially rectangular shape. The flexible substrate 13 need not have a complete rectangular shape, but a part of the outer periphery thereof may be protruded or recessed.

The signal transmitting coil 8 according to the present embodiment is a one-turn loop coil and formed so as to draw the largest possible loop along the outer periphery of the flexible substrate 13. Specifically, the signal transmitting coil 8 includes a first wiring part 8a extending along one long side 13a of the flexible substrate 13, a second wiring part 8b extending along the other long side 13b, a third wiring part 8c extending along one short side 13c, and a fourth wiring part 8d extending along the other short side 13d. In this example, the third wiring part 8c, first wiring part 8a, fourth wiring part 8d, and second wiring part 8b are continuously formed in this order. The third wiring part 8c serves as one turnover part of the loop coil which is positioned at one end $13e_1$ side of the flexible substrate 13 in the longitudinal direction, and the fourth wiring part 8d serves as the other turnover part of the loop coil which is positioned at the other end $13e_2$ side of the flexible substrate 13 in the longitudinal direction. The one and the other ends $8e_1$ and $8e_2$ of the signal transmitting coil 8 are connected to the power receiving circuit board 11b through an unillustrated lead wire.

As illustrated in FIG. 5B, the flexible substrate 13 on which the signal transmitting coil 8 is formed is rolled so as to surround the rotary axis Z to form a cylindrical body. The one end $13e_1$ of the flexible substrate 13 in the longitudinal direction is connected to the other end $13e_2$, whereby the third wiring part 8c is disposed in proximity to the fourth wiring part 8d. The signal transmitting coil 8 is formed into a cylindrical surface, so that the first wiring part 8a and the second wiring part 8b extend in the circumferential direction, while the third wiring part 8c and the fourth wiring part 8d extend in parallel to the rotary axis Z.

The signal transmitting coil 8 is circulated clockwise around the rotary axis Z from the one end $13e_1$ side of the flexible substrate 13 in the longitudinal direction, turned over at the other end $13e_2$ side of the flexible substrate 13 in the longitudinal direction, circulated counterclockwise around the rotary axis Z, and returned to the one end $13e_1$ side of the flexible substrate 13 in the longitudinal direction. Thus, the third wiring part 8c extending in the rotary axis direction constitutes a one-end side bent part of the loop coil in the longitudinal direction, and the fourth wiring part 8d extending in the rotary axis direction constitutes the other-end side bent part of the loop coil in the longitudinal direction.

It is sufficient that the third wiring part 8c is turned over in the direction of rotary axis Z from the one end of the first wiring part 8a or one end of the second wiring part 8b, and that the fourth wiring part 8d is turned over in the direction rotary axis Z from the other end of the first wiring part 8a or the other end of the second wiring part 8b. That is, the third wiring part 8c and fourth wiring part 8d need not extend in parallel to the rotary axis Z. In other words, the third wiring part 8c and fourth wiring part 8d may extend obliquely with respect to the rotary axis Z.

In the present embodiment, the third wiring part 8c is disposed in proximity to the fourth wiring part 8d; however, they do not overlap each other when viewed in the radial direction orthogonal to the rotary axis Z (that is, when viewed from above the cylindrical surface) and do not even contact each other. Accordingly, a gap G is formed between the bent part at the one end side of the loop coil formed on the cylindrical surface in the longitudinal direction (circumferential direction) and the bent part at the other end side of the loop coil. While a pair of terminals ($8e_1$ and $8e_2$) face downward in the signal transmitting coil 8 illustrated in FIG. 5B, the signal transmitting coil 8 is installed upside down at the time of use such that the pair of terminals face upward as illustrated in FIG. 2.

The basic configuration of the signal receiving coil 9 is the same as that of the signal transmitting coil 8 but differs therefrom in that the flexible substrate 13 of the signal receiving coil 9 is rolled to a smaller size so as to be positioned inside the signal transmitting coil 8 and that the turnover parts at the both sides of the loop coil in the longitudinal direction match each other or overlap each other when viewed in the radial direction orthogonal to the rotary axis Z.

Figure 6:
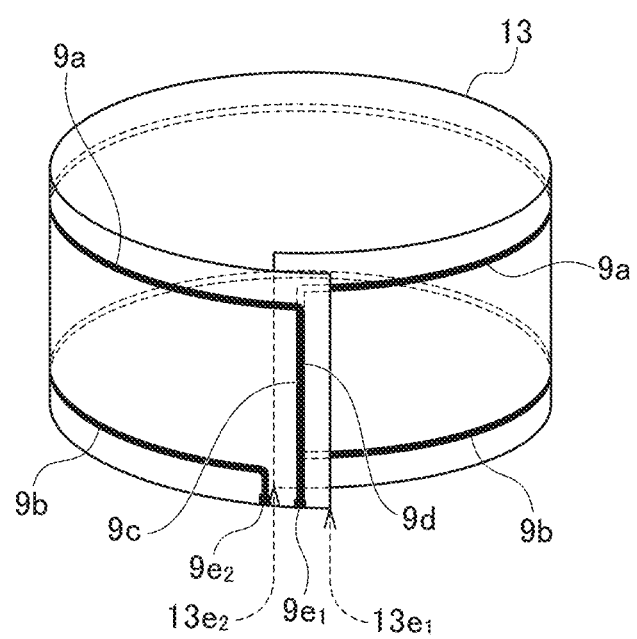
FIG. 6 is a perspective view illustrating the configuration of the signal receiving coil.

FIG. 6 is a perspective view illustrating the configuration of the signal receiving coil 9.

As illustrated in FIG. 6, the flexible substrate 13 of the signal receiving coil 9 is rolled so as to surround the rotary axis Z to form a cylindrical body. The one end $13e_1$ of the flexible substrate 13 in the longitudinal direction is connected to the other end $13e_2$, whereby a third wiring part 9c is disposed in proximity to a fourth wiring part 9d. The signal receiving coil 9 is formed into a cylindrical surface, so that a first wiring part 9a and a second wiring part 9b extend in the circumferential direction, while the third wiring part 9c and the fourth wiring part 9d extend in parallel to the rotary axis Z. The third wiring part 9c extending in the rotary axis direction constitutes the one-end side bent part of the loop coil in the longitudinal direction, and the fourth wiring part 9d extending in the rotary axis direction constitutes the other-end side bent part of the loop coil in the longitudinal direction. The one and the other ends $9e_1$ and $9e_2$ of the signal receiving coil 9 are connected to the power transmitting circuit board 11a through an unillustrated lead wire.

In the present embodiment, the one end $13e_1$ of the flexible substrate 13 in the longitudinal direction significantly overlaps the other end $13e_2$, so that the third wiring part 9c overlaps the fourth wiring part 9d when viewed in the radial direction orthogonal to the rotary axis Z, with the result that no gap exists between the third wiring part 9c and the fourth wiring part 9d. Thus, substantially the entire periphery of the cylindrical body excluding the formation region of the third and fourth wiring parts 9c and 9d can be made into the formation region of the opening of the loop coil, making it possible to maximize the opening size of the signal receiving coil 9.

Figure 7D:
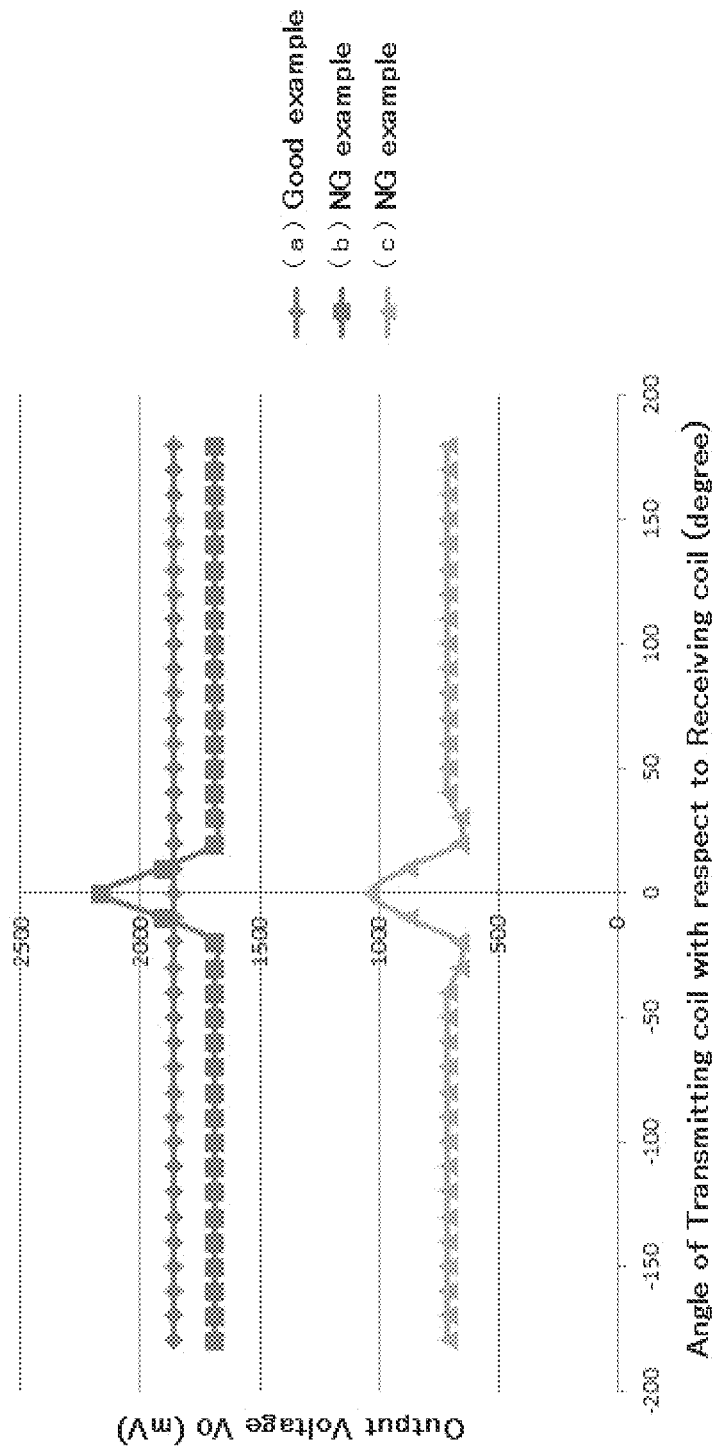
FIG. 7D is a graph illustrating a variation in the output of the signal receiving coil when the signal transmitting coil illustrated in FIGS. 7A to 7C is rotated by 360°.

FIGS. 7A to 7C are views each illustrating an example of a combination of the signal transmitting coil 8 and the signal receiving coil 9. FIG. 7A illustrates a case where the turnover parts at the both ends of the signal receiving coil 9 in the longitudinal direction overlap each other, and FIGS. 7B and 7C illustrate a case where the bent parts at the both ends of the signal receiving coil 9 in the longitudinal direction do not overlap each other. In any of FIGS. 7A to 7C, the bent parts at the both ends of the signal transmitting coil 8 in the longitudinal direction do not overlap each other, and the gap G is formed between the bent parts. FIG. 7D is a graph illustrating a variation in the output level of the signal receiving coil 9 when the signal transmitting coil 8 illustrated in FIGS. 7A to 7C is rotated by 360°, wherein the horizontal axis represents the rotation angle of the signal transmitting coil 8 with respect to the signal receiving coil 9, and the vertical axis represents an output voltage (mV). In FIG. 7D, a line (a) shows a characteristic of the configuration of FIG. 7A, a line (b) shows a characteristic of the configuration of FIG. 7B, a line (c) shows a characteristic of the configuration of FIG. 7C. The position (reference angle) at which the rotation angle represented by the horizontal axis is 0° corresponds to a position at which the gap G of the signal transmitting coil 8 overlaps the overlapping portion between the bent parts of the signal receiving coil 9 or the gap G of the signal receiving coil 9.

When the end portions of the flexible substrate 13 of the signal receiving coil 9 in the longitudinal direction do not overlap each other at all as illustrated in FIG. 7B, or when the end portions of the flexible substrate 13 of the signal receiving coil 9 in the longitudinal direction overlap a little each other, the bent parts of the signal receiving coil 9 do not overlap when viewed from above the cylindrical surface, so that the gap G is formed between the third wiring part 9c and the fourth wiring part 9d. In this case, magnetic coupling temporarily strengthens at a timing when the gap G of the signal transmitting coil 8 and the gap G of the signal receiving coil 9 overlap each other. Thus, at this timing, the reception sensitivity of the signal receiving coil 9 becomes high, resulting in a variation in the output level of a signal voltage. Such a variation acts as noise against power control.

Even when the end portions of the flexible substrate 13 of the signal receiving coil 9 in the longitudinal direction overlap significantly each other as illustrated in FIG. 7C, the bent parts of the signal receiving coil 9 do not overlap each other when viewed from above the cylindrical surface, so that the gap G is formed between the third wiring part 9c and the fourth wiring part 9d. In this case, as above, a variation in the output level of a signal voltage occurs at a timing when the gap G of the signal transmitting coil 8 and the gap G of the signal receiving coil 9 overlap each other. In the case of FIG. 7C, the output voltage becomes lower than that in the case of FIG. 7B as a whole.

On the other hand, when the gap G does not exist between the third wiring part 9c and the fourth wiring part 9d of the signal receiving coil 9 as illustrated in FIG. 7A, a change in the overlapping area between the openings of the signal transmitting coil 8 and the signal receiving coil 9 can be suppressed even when the signal transmitting coil 8 is rotated by 360° as illustrated in FIG. 7D to change the positional relationship between the signal transmitting coil 8 and the signal receiving coil 9, thereby making it possible to reduce a variation in the output level of a signal voltage from the signal receiving coil 9. Therefore, in a rotary type magnetic coupling device used for a rotator, stable output characteristics can be obtained even when the positional relationship between coils is changed in accordance with the rotation amount of the rotator.

FIGS. 8A to 8F are detailed explanatory views each illustrating the positional relationship between the third wiring part 9c and the fourth wiring part 9d constituting the respective turnover parts at the both ends of the signal receiving coil 9 in the longitudinal direction.

Figure 8A:
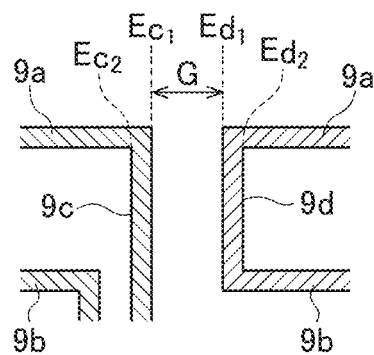
FIGS. 8A to 8F are detailed explanatory views each illustrating the positional relationship between the third wiring part and the fourth wiring part constituting the respective turnover parts at the both ends of the signal receiving coil in the longitudinal direction.
Figure 8B:
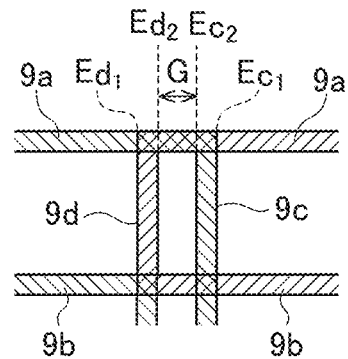

When the distance between an outer edge $Ec_1$ of the third wiring part 9c of the signal receiving coil 9 and an outer edge $Ed_1$ of the fourth wiring part 9d is large as illustrated in FIG. 8A, the gap G is formed between the third wiring part 9c and the fourth wiring part 9d, so that the above-mentioned output level variation associated with rotation of the signal transmitting coil 8 occurs. Further, when the third wiring part 9c of the signal receiving coil 9 goes over the fourth wiring part 9d (significantly overlaps the fourth wiring part 9d) as illustrated in FIG. 8B, the gap G is formed between an inner edge $Ec_2$ of the third wiring part 9c and an inner edge $Ed_2$ of the fourth wiring part 9d, so that the above-mentioned output level variation associated with rotation of the signal transmitting coil 8 occurs.

Figure 8C:
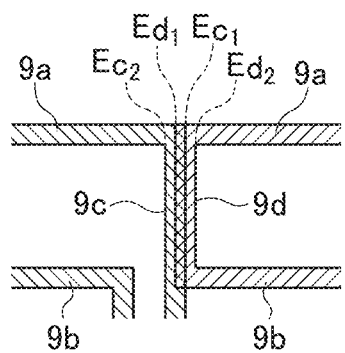
Figure 8D:
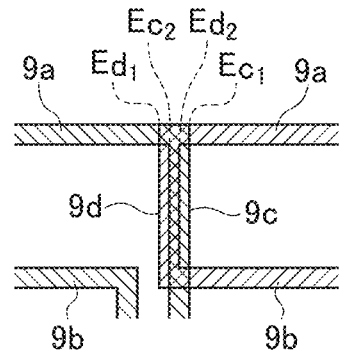

On the other hand, when a part of the third wiring part 9c of the signal receiving coil 9 overlaps a part of the fourth wiring part 9d as illustrated in FIGS. 8C and 8D, the gap G is not formed between the third wiring part 9c and the fourth wiring part 9d, so that the above-mentioned output level variation associated with rotation of the signal transmitting coil 8 does not occur. The same can be said for a case where the third wiring part 9c and the fourth wiring part 9d completely overlap each other.

Figure 8E:
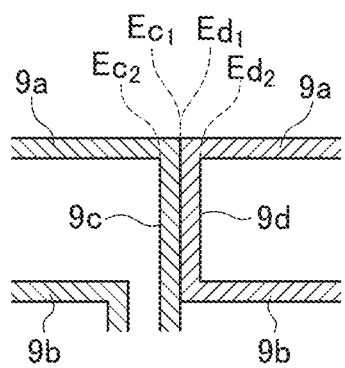

Further, even in a case where the third wiring part 9c of the signal receiving coil 9 and the fourth wiring part 9d do not overlap each other, when the outer edge $Ec_1$ of the third wiring part 9c and the outer edge $Ed_1$ of the fourth wiring part 9d match each other as illustrated in FIG. 8E, the gap G is not formed between the third wiring part 9c and the fourth wiring part 9d, so that the above-mentioned output level variation associated with rotation of the signal transmitting coil 8 does not occur.

Figure 8F:
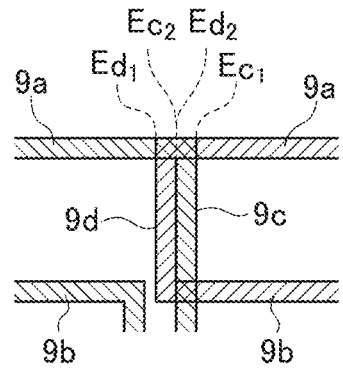

Further, even in a case where the third wiring part 9c of the signal receiving coil 9 and the fourth wiring part 9d do not overlap each other, when the inner edge $Ec_2$ of the third wiring part 9c and the inner edge $Ed_2$ of the fourth wiring part 9d match each other as illustrated in FIG. 8F, the gap G is not formed between the third wiring part 9c and the fourth wiring part 9d, so that the above-mentioned output level variation associated with rotation of the signal transmitting coil 8 does not occur.

As described above, when the turnover parts of the loop coil positioned on the both ends of the signal receiving coil 9 in the longitudinal direction match or overlap each other, a variation in the output voltage of the signal receiving coil 9 associated with rotation of the signal transmitting coil 8 can be suppressed.

Figure 9A:
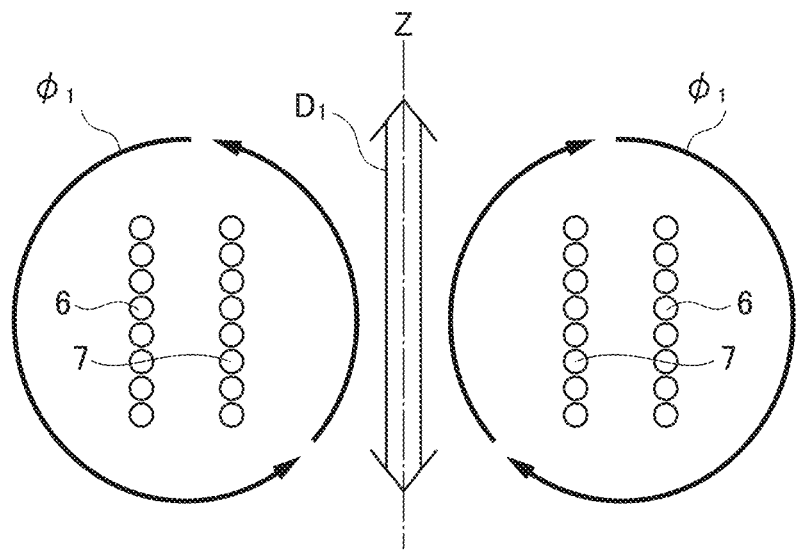
FIG. 9A is a schematic cross-sectional view for explaining a magnetic coupling state between the power transmitting coil and the power receiving coil.
Figure 9B:
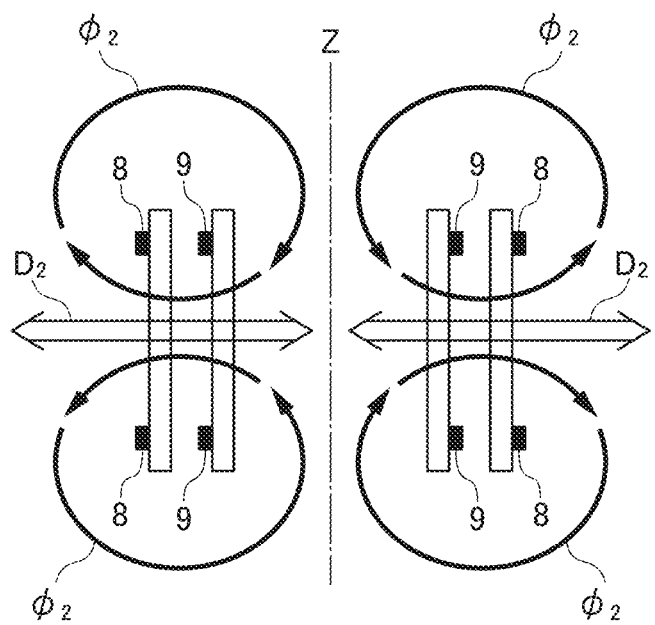
FIG. 9B is a schematic cross-sectional view for explaining a magnetic coupling state between the signal transmitting coil and the signal receiving coil.

FIG. 9A is a schematic cross-sectional view for explaining a magnetic coupling state between the power transmitting coil 6 and the power receiving coil 7, and FIG. 9B is a schematic cross-sectional view for explaining a magnetic coupling state between the signal transmitting coil 8 and the signal receiving coil 9.

As illustrated in FIG. 9A, the openings of the respective power transmitting coil 6 and the power receiving coil 7 constituting the power system rotary transformer $T_P$ open in the direction of the rotary axis Z, and the direction of a magnetic flux $\phi_1$ intersecting the power transmitting coil 6 and the power receiving coil 7 is parallel to the rotary axis Z as denoted by the arrow $D_1$.

On the other hand, as illustrated in FIG. 9B, the openings of the respective signal transmitting coil 8 and the signal receiving coil 9 constituting the signal system rotary transformer $T_S$ open in the radial direction orthogonal to the rotary axis Z, and a magnetic flux $\phi_2$ intersecting the signal transmitting coil 8 and the signal receiving coil 9 is directed in the radial direction orthogonal to the rotary axis Z as denoted by the arrow $D_2$. As described above, the direction of the magnetic flux $\phi_1$ is orthogonal to the direction of the magnetic flux $\phi_2$, so that it is possible to minimize influence that the magnetic flux of one of the power system and signal system has on the magnetic flux of the other one of them.

Figure 10A:
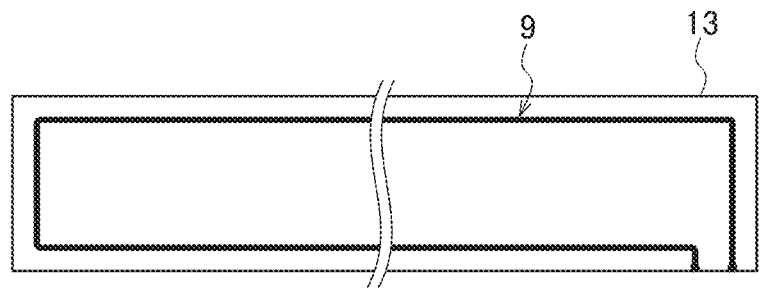
FIGS. 10A and 10B are views illustrating a first modification of the signal receiving coil, where
Figure 10B:
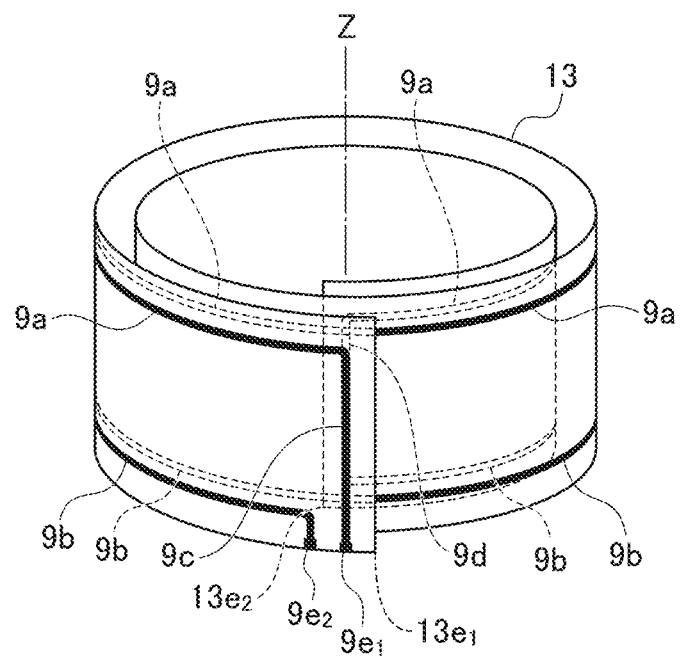

FIGS. 10A and 10B are views illustrating a first modification of the signal receiving coil 9. FIG. 10A is a developed plan view, and FIG. 10B is a perspective view.

As illustrated in FIGS. 10A and 10B, the signal receiving coil 9 of the first modification is a cylindrical body obtained by forming a loop coil along the outer periphery of the very long flexible substrate 13 and rolling the flexible substrate 13 in multiple (in this example, double). The number of windings of the flexible substrate 13 is not especially limited. When the signal receiving coil 9 as illustrated in FIG. 6 is formed, the overlapping degree between the both ends of the flexible substrate 13 in the longitudinal direction is adjusted so as not to form the gap G between the third wiring part 9c constituting the one-end side bent part of the loop coil in the longitudinal direction and the fourth wiring part 9d constituting the other-end side bent part. According to the thus configured signal receiving coil 9, the inductance of the loop coil can be increased to strengthen magnetic coupling.

When the signal receiving coil 9 is formed into a cylindrical body obtained by rolling the flexible substrate 13 in multiple, the number of windings is preferably made equal between the signal transmitting coil 8 and the signal receiving coil 9. When the signal transmitting coil 8 as illustrated in FIGS. 5A and 5B is formed, the overlapping degree between the both ends of the flexible substrate 13 in the longitudinal direction is adjusted so as to form the gap G between the third wiring part 9c constituting the one end side turnover part of the loop coil in the longitudinal direction and the fourth wiring part 9d constituting the other-end side bent part.

Figure 11A:
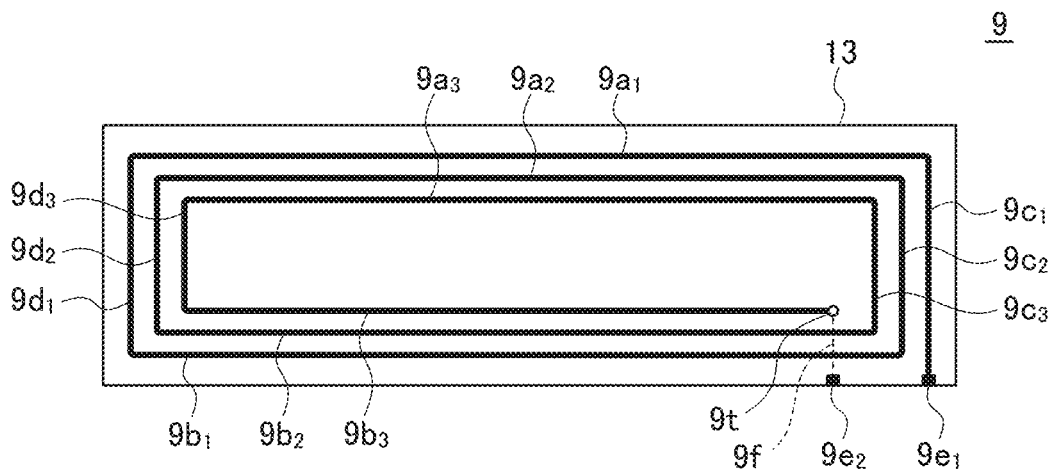
FIGS. 11A to 11C are views illustrating a second modification of the signal receiving coil, where
Figure 11B:
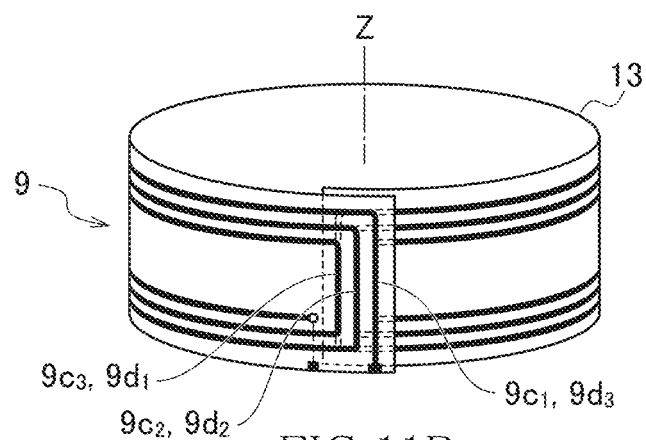
Figure 11C:
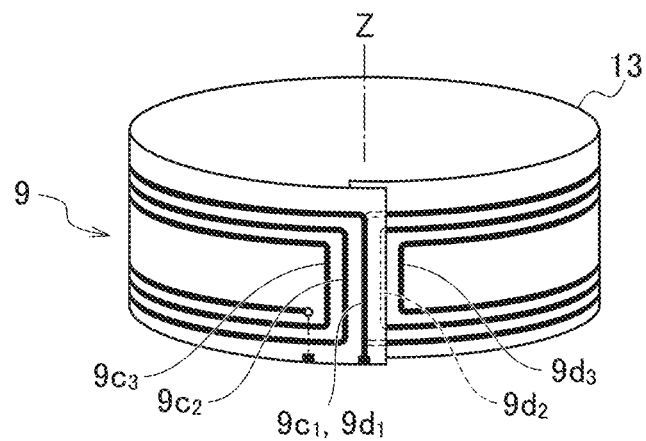

FIGS. 11A to 11C are views illustrating a second modification of the signal receiving coil 9. FIG. 11A is a developed plan view, FIG. 11B is a perspective view, and FIG. 11C is a perspective view illustrating a comparison example.

As illustrated in FIG. 11A, the signal receiving coil 9 may be formed as a planar spiral coil including a loop coil of a plurality of turns (in this example, three turns). Specifically, the first turn of the planar spiral coil includes a first wiring part $9a_1$, a second wiring part $9b_1$, a third wiring part $9c_1$, and a fourth wiring part $9d_1$; the second turn includes a first wiring part $9a_2$, a second wiring part $9b_2$, a third wiring part $9c_2$, and a fourth wiring part $9d_2$; and the third turn includes a first wiring part $9a_3$, a second wiring part $9b_3$, a third wiring part $9c_3$, and a fourth wiring part $9d_3$. The second wiring part $9b_3$ of the third turn is connected to a terminal $9e_2$ through a through hole conductor 9t and a lead-out conductor 9f. The number of turns of the planar spiral coil is not especially limited.

As illustrated in FIG. 11B, when the signal receiving coil 9 is formed as a planar spiral coil of three turns, a set of three third wiring parts $9c_1$, $9c_2$, and $9c_3$ and a set of three fourth wiring parts $9d_1$, $9d_2$, and $9d_3$ preferably overlap each other completely or match each other. For example, when only the third wiring part $9c_1$ of the first turn and the fourth wiring part $9d_1$ of the first turn overlap each other as illustrated in FIG. 11C, a change in the overlapping area between the openings of the signal transmitting coil 8 and signal receiving coil 9 is large, so that a variation in the output voltage associated with rotation of the signal transmitting coil 8 cannot be suppressed sufficiently. However, when a set of three third wiring parts and a set of three fourth wiring parts overlap each other completely, it is possible to suppress a variation in the output level of a signal voltage associated with rotation of the signal transmitting coil 8.

When the signal receiving coil 9 is formed as a planar spiral coil as illustrated in FIGS. 11A and 11B, the signal transmitting coil 8 also is preferably formed as a planar spiral coil of the same number of turns as that of the signal receiving coil 9. In this case, the signal transmitting coil 8 may be configured such that only the third wiring part $9c_1$ of the first turn and the fourth wiring part $9d_1$ of the first turn overlap each other as illustrated in FIG. 11C, and further such that three third wiring parts $9c_1$, $9c_2$, and $9c_3$ and three fourth wiring parts $9d_1$, $9d_2$, and $9d_3$ do not overlap at all.

FIGS. 12A to 12C are plan views of a third modification of the signal receiving coil 9, which illustrate pattern layouts of respective layer constituting a multilayer coil.

As illustrated in FIGS. 12A to 12C, the signal receiving coil 9 may be a multilayer coil in which loop coils are formed in a layered manner so as to overlap each other in the lamination direction. Specifically, a loop coil of a first turn on a first layer $13L_1$ includes a first wiring part $9a_1$, a second wiring pattern $9b_1$, a third wiring pattern $9c_1$, and a fourth wiring pattern $9d_1$; a loop coil of a second turn on a second layer $13L_2$ includes a first wiring part $9a_2$, a second wiring pattern $9b_2$, a third wiring pattern $9c_2$, and a fourth wiring pattern $9d_2$; and a loop coil of a third turn on a third layer $13L_3$ includes a first wiring part $9a_3$, a second wiring pattern $9b_3$, a third wiring pattern $9c_3$, and a fourth wiring pattern $9d_3$. The end portions of the loop coils of the respective first and second turns are connected to each other through a first through hole conductor $9t_1$, and end portions of the loop coils of the respective second and third turns are connected to each other through a second through hole conductor $9t_2$. Further, the terminal end of the loop coil of the third turn is connected to a terminal $9e_2$ through a third through hole conductor $9t_3$ and a lead-out conductor $9f$.

When the signal receiving coil 9 is formed as a multilayer coil as illustrated in FIGS. 12A to 12C, the signal transmitting coil 8 also is preferably formed as a multilayer coil of the same number of turns as that of the signal receiving coil 9. In this case, in the signal transmitting coil 8, the overlapping degree between the both ends of the flexible substrate 13 in the longitudinal direction is adjusted so as to form the gap G between the third wiring parts $9c_1$, $9c_2$, and $9c_3$ and the fourth wiring parts $9d_1$, $9d_2$, and $9d_3$ constituting the bent parts at the both ends of the loop coil in the longitudinal direction.

As described above, in the rotary type magnetic coupling device 1 according to the present embodiment, the power transmitting coil 6 (first coil) and the power receiving coil 7 (second coil) are disposed so as to circle around the rotary axis Z of a rotator, and openings of the respective signal transmitting coil 8 (third coil) and signal receiving coil 9 (fourth coil) surround the rotary axis Z of the rotator. Thus, even when the rotator is rotated, it is possible to achieve both power transmission from the power transmitting coil 6 to the power receiving coil 7 and signal transmission from the signal transmitting coil 8 to the signal receiving coil 9. In addition, the openings of the respective power transmitting coil 6 and power receiving coil 7 open in the direction of the rotary axis Z, and the openings of the respective signal transmitting coil 8 and the signal receiving coil 9 open in the radial direction orthogonal to the rotary axis Z, so that the coil axes of the respective power transmitting coil 6 and power receiving coil 7 and coil axes of the respective signal transmitting coil 8 and the signal receiving coil 9 are orthogonal to each other, with the result that the direction of the magnetic flux $\phi_1$ intersecting the power transmitting coil 6 and the power receiving coil 7 can be orthogonal to the direction of the magnetic flux $\phi_2$ intersecting the signal transmitting coil 8 and the signal receiving coil 9. Thus, in the rotary type magnetic coupling device used for a rotator, it is possible to reduce influence that one of power transmission and signal transmission has on the other one of them.

Further, in the rotary type magnetic coupling device according to the present embodiment, the signal transmitting coil 8 (third coil) and the signal receiving coil 9 (fourth coil) are each a loop coil whose opening surrounds the rotary axis Z of a rotator. The loop coil includes the first and second wiring parts (8a, 8b or 9a, 9b) extending in the peripheral direction of the rotator, the third wiring part (8c or 9c) bent in a direction parallel to the rotary axis Z from one end of the first wiring part (8a or 9a) or second wiring part (8b or 9b), and the fourth wiring part (8d or 9d) bent in a direction parallel to the rotary axis Z from the other end of the first wiring part (8a or 9a) or second wiring part (8b or 9b), and the third wiring part and fourth wiring part of at least one of the signal transmitting coil 8 and the signal receiving coil 9 match or overlap each other when viewed in the radial direction orthogonal to the rotary axis Z. With the above configuration, even when the positional relationship between the signal transmitting coil 8 and the signal receiving coil 9 is changed in association with rotation of the rotator, a change in the overlapping area between the openings of the respective signal transmitting coil 8 and signal receiving coil 9 can be suppressed, which in turn can suppress a change in a transmission ratio between the signal transmitting coil 8 and the signal receiving coil 9. Thus, in the rotary type magnetic coupling device 1 used for a rotator, it is possible to obtain stable power or signal output characteristics regardless of rotation of the rotator.

It is apparent that the present invention is not limited to the above embodiments, but may be modified and changed without departing from the scope and spirit of the invention.

Figures 13A, 13B, 13C:
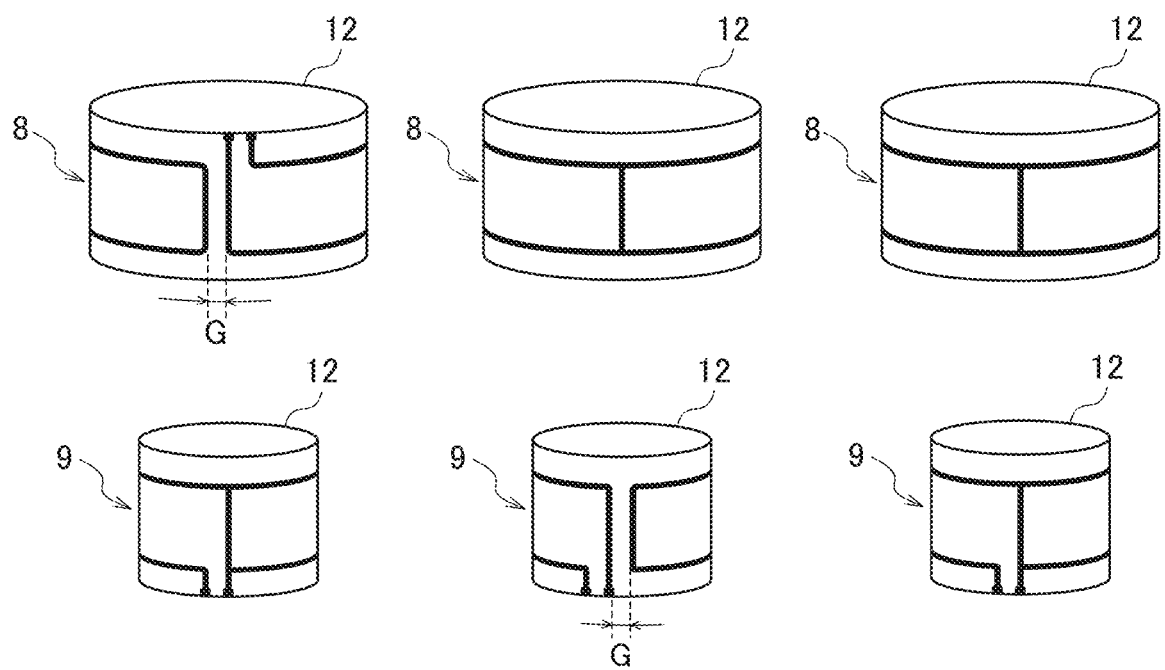
FIGS. 13A to 13C are perspective views of modifications of a combination of the signal transmitting coil and the signal receiving coil.

For example, in the above embodiment, the signal transmitting coil 8 has the gap G, while the signal receiving coil 9 does not have the gap G, as illustrated in FIG. 13A; however, the present invention is not limited to such a configuration. For example, as illustrated in FIG. 13B, a configuration may be possible in which the signal transmitting coil 8 does not have the gap G, while the signal receiving coil 9 has the gap G. Further, a configuration may also be possible in which neither the signal transmitting coil 8 nor the signal receiving coil 9 has the gap G. When neither the signal transmitting coil 8 nor the signal receiving coil 9 has the gap G as illustrated in FIG. 13C, a change in the overlapping area between the openings of the respective signal transmitting coil 8 and signal receiving coil 9 can be suppressed sufficiently. This can further suppress a variation in the output voltage of the signal receiving coil 9 associated with rotation of a rotator and can strengthen magnetic coupling between the signal transmitting coil 8 and the signal receiving coil 9 to thereby further improve transmission efficiency.

Further, in the above embodiment, the rotary transformer constituted of the coils 6 and 7 is used for power transmission, and the rotary transformer constituted of the coils 8 and 9 is used for signal transmission; however, both the rotary transformer constituted of the coils 6 and 7 and the rotary transformer constituted of the coils 8 and 9 may be used for power transmission. Further, both the rotary transformer constituted of the coils 6 and 7 and the rotary transformer constituted of the coils 8 and 9 may be used for signal transmission.

Further, in the above embodiment, the power transmitting coil 6 and power receiving coil 7 constituting the power system rotary transformer $T_P$ are disposed outside the signal transmitting coil 8 and the signal receiving coil 9 constituting the signal system rotary transformer $T_S$ in the radial direction of a rotator; however, the power transmitting coil 6 and power receiving coil 7 may be disposed inside the signal transmitting coil 8 and the signal receiving coil 9 in the radial direction. However, when the power transmitting coil 6 and the power receiving coil 7 are disposed outside the signal transmitting coil 8 and the signal receiving coil 9 in the radial direction, the opening sizes of the respective power transmitting coil 6 and power receiving coil 7 can be made larger, thereby allowing transmission of a larger amount of power.

Further, in the above embodiment, the intermediate magnetic member 10a is a single magnetic member that provides a common magnetic path for the power system and signal system; however, the intermediate magnetic member 10a may be divided into two parts. In this case, one intermediate magnetic member may be used to provide a magnetic path for the power system rotary transformer $T_P$ and the other may be used to provide a magnetic path for the signal system rotary transformer $T_S$.

As described above, according to the present embodiment, there is provided a rotary type magnetic coupling device used for a rotator, the magnetic coupling device including a first coil, a second coil disposed so as to be magnetically coupled to the first coil, a third coil, and a fourth coil disposed so as to be magnetically coupled to the third coil. Coil axes of the first and second coils extend in the rotary axis direction of the rotator, and coil axes of the third and fourth coils radially extend in the radial direction orthogonal to the rotary axis of the rotator.

According to the present embodiment, even when the rotator is rotated, one of a power and a signal can be transmitted and received between the first and second coils, and the other of the power and the signal can be transmitted and received between the third and fourth coils. In addition, the coil axes of the first and second coils extend in the rotary axis direction, and coil axes of the third and fourth coils radially extend in the radial direction orthogonal to the rotary axis, so that the direction of magnetic flux intersecting the third and fourth coils can be made orthogonal to the direction of magnetic flux intersecting the first and second coils. Thus, it is possible to minimize mutual influence between the power or signal transmission between the first and second coils and power or signal transmission between the third and fourth coils.

In the present embodiment, it is preferable that the first and second coils are wound concentrically such that openings thereof overlap each other in the rotary axis direction and that the third and fourth coils are disposed such that openings thereof surround the rotary axis in the peripheral direction so as to overlap each other in the radial direction. With this configuration, the coil axes of the first and second coils can be made to extend in the rotary axis direction, and the coil axes of the third and fourth coils can be made to radially extend in the radial direction orthogonal to the rotary axis. Thus, the direction of the magnetic flux intersecting the third and fourth coils can be made orthogonal to the direction of the magnetic flux intersecting the first and second coils.

In the present embodiment, it is preferable that the first and second coils transmit one of a power and a signal and that the third and fourth coils transmit the other one thereof. With this configuration, it is possible to realize a rotary type magnetic coupling device constituted of a combination of a power system transformer and a signal system transformer.

In the present embodiment, it is preferable that the first and second coils are disposed outside the third and fourth coils in the radial direction. In this case, it is preferable that the first and second coils transmit power and that the third and fourth coils transmit a signal. With this configuration, as compared to a case where the first and second coils are disposed inside the third and fourth coils in the radial direction of the rotator, the opening sizes of the respective first and second coils can be made larger, thus making it possible to obtain stronger magnetic coupling. Further, with this configuration, the inductances of the first and second coils can be increased.

The rotary type magnetic coupling device according to the present embodiment preferably further includes a first magnetic member disposed between the first and second coils and third and fourth coils. With this configuration, the first and second coils are magnetically shielded from the third and fourth coils, whereby mutual influence between power or signal transmission using the first and second coils and power or signal transmission using the third and fourth coils can be further reduced.

The rotary type magnetic coupling device according to the present embodiment preferably further includes a second magnetic member disposed inside the first to fourth coils in the radial direction. With this configuration, a magnetic path of magnetic flux generated by the third and fourth coils or magnetic flux generated by the first and second coils can be formed. Thus, it is possible to reduce a power transmission loss or signal transmission loss.

In the present embodiment, it is preferable that the second magnetic member is disposed between a metal rotary shaft serving as the rotary axis and first to fourth coils so as to surround the rotary shaft. With this configuration, even when the metal rotary shaft is disposed near the first to fourth coils, it is possible to reduce an eddy current loss caused due to intersection of magnetic flux generated by the first to fourth coils with the metal rotary shaft.

The rotary type magnetic coupling device according to the present embodiment preferably further includes a third magnetic member disposed outside the first to fourth coils in the radial direction so as to surround them. With this configuration, a magnetic path of magnetic flux generated by the first and second coils or magnetic flux generated by the third and fourth coils can be formed. Thus, even when a metal member is disposed near the first to fourth coils, it is possible to reduce an eddy current loss caused due to intersection of magnetic flux generated by the first to fourth coils with the metal member.

The rotary type magnetic coupling device according to the present embodiment preferably further includes a fourth magnetic member that covers the both ends of the first to fourth coils in the rotary axis direction. With this configuration, a magnetic path of magnetic flux generated by the first to fourth coils can be formed. Thus, it is possible to reduce a power transmission loss or signal transmission loss.

In the present embodiment, it is preferable that the first and second coils each have a configuration in which a conducting wire is wound in the peripheral direction of the rotator. With this configuration, a large amount of current can be made to flow in the first and second coils. This allows transmission of a large amount of power by wireless.

It is preferable that the third and fourth coils are each obtained by printing a conductor pattern on a flexible substrate. With this configuration, it is possible to easily realize a coil having an opening (coil axis) opened in the radial direction orthogonal to the rotary axis of the rotator while surrounding the rotary axis.

The rotary type magnetic coupling device according to the present embodiment preferably further includes a rotary bobbin configured to be rotated together with the rotator and a fixed bobbin fitted to the rotary bobbin and configured not to be rotated together with the rotator. The first and fourth coils are preferably provided in the fixed bobbin, and the second and third coils are preferably provided in the rotary bobbin. A first rotary transformer constituted of the first and second coils and a second rotary transformer constituted of the third and fourth coils can be easily incorporated in a single rotator.

In the present embodiment, it is preferable that the fixed bobbin has a cylindrical first outer side-surface part and a cylindrical first inner side-surface part provided inside the first outer side-surface part in the radial direction, that the first coil is provided on the first outer side-surface part, and that the fourth coil is provided on the first inner side-surface part. Further, it is preferable that the rotary bobbin has a cylindrical second outer side-surface part and a cylindrical second inner side-surface part provided inside the second outer side-surface part in the radial direction, that the second coil is provided on the second outer side-surface part, and that the third coil is provided on the second inner side-surface part. Thus, the opening sizes of the respective first and second coils can be made large with a simple configuration.

In the present embodiment, it is preferable that the third and fourth coils are each a loop coil disposed such that the opening thereof surrounds the rotary axis of the rotator, that the loop coil has first and second wiring parts extending in the peripheral direction of the rotator, a third wiring part bent in the rotary axis direction from one end of the first wiring part or one end of the second wiring part, and a fourth wiring part bent in the rotary axis direction from the other end of the first wiring part or the other end of the second wiring part, and that at least one of the third and fourth coils is configured such that the third wiring part and fourth wiring part match or overlap each other when viewed in the radial direction orthogonal to the rotary axis. With this configuration, even when the positional relationship between the third and fourth coils is changed in association with rotation of the rotator, a change in the overlapping area between the openings of the respective third and fourth coils can be suppressed, which in turn can suppress a change in a transmission ratio therebetween. Thus, in the rotary type magnetic coupling device used for a rotator, it is possible to obtain stable power or signal output characteristics regardless of rotation of the rotator.

According to the present embodiment, there can be provided a rotary type magnetic coupling device used for a rotator, capable of reducing mutual influence between power transmission and signal transmission.

What is claimed is:

1. A rotary type magnetic coupling device used for a rotator, the rotary type magnetic coupling device comprising:
   first and second coils magnetically coupled to each other; and
   third and fourth coils magnetically coupled to each other,
   wherein coil axes of the first and second coils extend in a rotary axis direction of the rotator, and
   wherein coil axes of the third and fourth coils radially extend in a radial direction substantially orthogonal to the rotary axis of the rotator.

2. The rotary type magnetic coupling device as claimed in claim 1,
   wherein the first and second coils are wound concentrically in the rotary axis direction such that openings of the first and second coils overlap each other, and
   wherein the third and fourth coils are disposed such that openings of the third and fourth coils surround the rotary axis in a peripheral direction so as to overlap each other in the radial direction.

3. The rotary type magnetic coupling device as claimed in claim 1,
   wherein the first and second coils transmit one of a power and a signal, and
   wherein the third and fourth coils transmit an other of the power and the signal.

4. The rotary type magnetic coupling device as claimed in claim 1, wherein the first and second coils are disposed outside the third and fourth coils in the radial direction.

5. The rotary type magnetic coupling device as claimed in claim 1, further comprising a first magnetic member disposed between the first and second coils and third and fourth coils.

6. The rotary type magnetic coupling device as claimed in claim 1, further comprising a second magnetic member disposed inside the first to fourth coils in the radial direction.

7. The rotary type magnetic coupling device as claimed in claim 6, wherein the second magnetic member is disposed between a metal rotary shaft serving as the rotary axis and first to fourth coils so as to surround the rotary shaft.

8. The rotary type magnetic coupling device as claimed in claim 1, further comprising a third magnetic member disposed outside the first to fourth coils in the radial direction so as to surround the first to fourth coils.

9. The rotary type magnetic coupling device as claimed in claim 1, further comprising a fourth magnetic member that covers both ends of the first to fourth coils in the rotary axis direction.

10. The rotary type magnetic coupling device as claimed in claim 1, wherein each of the first and second coils has a configuration in which a conducting wire is wound in the peripheral direction of the rotator.

11. The rotary type magnetic coupling device as claimed in claim 1, wherein each of the third and fourth coils includes a conductor pattern formed on a flexible substrate.

12. The rotary type magnetic coupling device as claimed in claim 1, further comprising:
    a rotary bobbin configured to be rotated together with the rotator; and
    a fixed bobbin fitted to the rotary bobbin and configured not to be rotated together with the rotator,
    wherein the first and fourth coils are provided in the fixed bobbin, and
    wherein the second and third coils are provided in the rotary bobbin.

13. The rotary type magnetic coupling device as claimed in claim 12,
    wherein the fixed bobbin includes:
      a cylindrical first outer side-surface part; and
      a cylindrical first inner side-surface part provided inside the first outer side-surface part in the radial direction,
    wherein the first coil is provided on the first outer side-surface part, and wherein the fourth coil is provided on the first inner side-surface part.

14. The rotary type magnetic coupling device as claimed in claim 13,
wherein the rotary bobbin includes:
- a cylindrical second outer side-surface part; and
- a cylindrical second inner side-surface part provided inside the second outer side-surface part in the radial direction, wherein the second coil is provided on the second outer side-surface part, and wherein the third coil is provided on the second inner side-surface part.

* * * * *